United States Patent
Sharma et al.

(10) Patent No.: US 9,686,407 B2
(45) Date of Patent: *Jun. 20, 2017

(54) CUSTOMER SERVICE CONTROLLER

(71) Applicant: Chicago Mercantile Exchange Inc., Chicago, IL (US)

(72) Inventors: Anil Sharma, Chicago, IL (US); Jin Mun, Chicago, IL (US); Subash Hingorani, Chicago, IL (US)

(73) Assignee: Chicago Mercantile Exchange Inc., Chicago, IL (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/270,728

(22) Filed: Sep. 20, 2016

(65) Prior Publication Data

US 2017/0013123 A1    Jan. 12, 2017

Related U.S. Application Data (63) Continuation of application No. 14/877,413, filed on Oct. 7, 2015, now Pat. No. 9,462,128, which is a
(Continued)

(51) Int. Cl.
*H04M 3/00* (2006.01)
*H04M 3/51* (2006.01)
(Continued)

(52) U.S. Cl.
CPC .... *H04M 3/5133* (2013.01); *G06F 17/30339* (2013.01); *G06F 17/30964* (2013.01);
(Continued)

(58) Field of Classification Search
CPC ... H04M 3/523; H04M 3/5232; H04M 3/5175
(Continued)

(56) References Cited

U.S. PATENT DOCUMENTS

| 6,373,836 B1 | 4/2002 | Deryugin et al. |
| 6,760,727 B1 | 7/2004 | Schroeder et al. |

(Continued)

FOREIGN PATENT DOCUMENTS

| GB | 2439363 A | 12/2007 |

OTHER PUBLICATIONS

Canadian Examiner's Report issued in CA Application No. 2,767,202, Mar. 23, 2015, CA.
(Continued)

*Primary Examiner* — Rasha Al Aubaidi
(74) *Attorney, Agent, or Firm* — Lempia Summerfield Katz LLC (57) ABSTRACT

Information about a request from a caller is provided in a customer service call center. In one embodiment, a customer service processor selects an agent based on the type of request and routes the call to the agent. The types of requests including one or more of cancelling all orders by a firm, canceling all orders by a trader, cancelling specific orders by a trader for more than one product, cancelling orders by more than one trader for a specific product, cancelling individual orders, changing the quantity of an individual order, and changing the quantity of a set of orders for a trader or a firm. Statistics may be collected regarding the call and stored for later use in a database.

30 Claims, 5 Drawing Sheets

Related U.S. Application Data continuation of application No. 14/614,880, filed on Feb. 5, 2015, now Pat. No. 9,189,790, which is a continuation of application No. 12/498,173, filed on Jul. 6, 2009, now Pat. No. 8,983,053.

(51) Int. Cl.

| | | |
|---|---|---|
| *G06Q 30/02* | (2012.01) | |
| *H04M 3/523* | (2006.01) | |
| *G06Q 30/00* | (2012.01) | |
| *G06Q 40/04* | (2012.01) | |
| *H04M 3/38* | (2006.01) | |
| *G06F 17/30* | (2006.01) | |
| *G06Q 10/06* | (2012.01) | |

(52) U.S. Cl.
CPC ....... *G06Q 10/0635* (2013.01); *G06Q 30/016* (2013.01); *G06Q 30/02* (2013.01); *G06Q 40/04* (2013.01); *H04M 3/382* (2013.01); *H04M 3/5166* (2013.01); *H04M 3/5183* (2013.01); *H04M 3/5233* (2013.01); *H04M 3/5235* (2013.01); *H04M 2203/558* (2013.01)

(58) Field of Classification Search
USPC .......................... 379/265.01–265.02, 266.01
See application file for complete search history.

(56) References Cited

U.S. PATENT DOCUMENTS

| | | |
|---|---|---|
| 7,613,650 B2 | 11/2009 | Smith et al. |
| 7,933,830 B1 | 4/2011 | Buck |
| 2003/0185381 A1 | 10/2003 | Power et al. |
| 2005/0175164 A1 | 8/2005 | Torng et al. |
| 2006/0146806 A1 | 7/2006 | Khuc et al. |
| 2006/0167941 A1 | 7/2006 | Huang et al. |
| 2008/0010084 A1 | 1/2008 | Castro et al. |
| 2008/0130632 A1 | 6/2008 | Leong |
| 2010/0146558 A1 | 6/2010 | Pandey |

OTHER PUBLICATIONS

Examiner's Report, from Australian Application No. 2010270833, Aug. 28, 2015, AU.
International Search Report and Written Opinion in PCT/US2010/040193, dated Sep. 22, 2010, 11 pages.

CUSTOMER SERVICE CONTROLLER

REFERENCE TO RELATED APPLICATIONS

This application is a continuation under 37 C.F.R. §1.53 (b) of U.S. patent application Ser. No. 14/877,413 filed Oct. 7, 2015 now U.S. Pat. No. 9,462,128, which is a continuation of U.S. patent application Ser. No. 14/614,880 filed Feb. 5, 2015 now U.S. Pat. No. 9,189,790, which is a continuation of U.S. patent application Ser. No. 12/498,173 filed Jul. 6, 2009 now U.S. Pat. No. 8,983,053 the entire disclosure of which is hereby incorporated by reference.

BACKGROUND

Management and operation of customer service call centers is a rapidly growing industry in recent times. A typical consumer dials a toll-free number several times per month seeking customer service. Call centers provide assistance relating to almost every good or service. Call centers field calls requesting technical support for computers and electronic devices, requesting assistance with banking or insurance claims, and sometimes even placing orders in the drive through at the local fast food chain.

Customer service call centers also operate within private networks of customers. For example, a company may employ a customer service call center to handle human resource questions and grievances from a private group of customers, such as hourly employees, salaried employees or other groups. Other companies or enterprises, such as commodities exchanges may use a call center to handle problems from a group of private customers, such as exchange registered traders, brokers, or other financial service professions. The problems experienced by the traders involve technical support questions regarding the software and hardware used at the exchange, or involve errors or changes in recent transactions at the exchange. Information regarding these transactions is stored outside of the customer service call center.

A system for a customer service call center is needed that can access information relating to recent transactions that is located outside of the call center and deliver that information to a call center agent with the routed customer call.

DETAILED DESCRIPTION OF THE DRAWINGS AND PRESENTLY PREFERRED EMBODIMENTS

The present embodiments relate to systems and methods for providing information about a caller to an agent, such as a customer service operator in a customer service call center. In one embodiment, the agent may receive detailed account and/or personal information about the caller before being connected to the actual or live call. For example, the agent receives information from a customer database regarding a customer profile and information from an order database regarding order or transaction information. The customer database and the order database are external to the call center.

Figure 1:
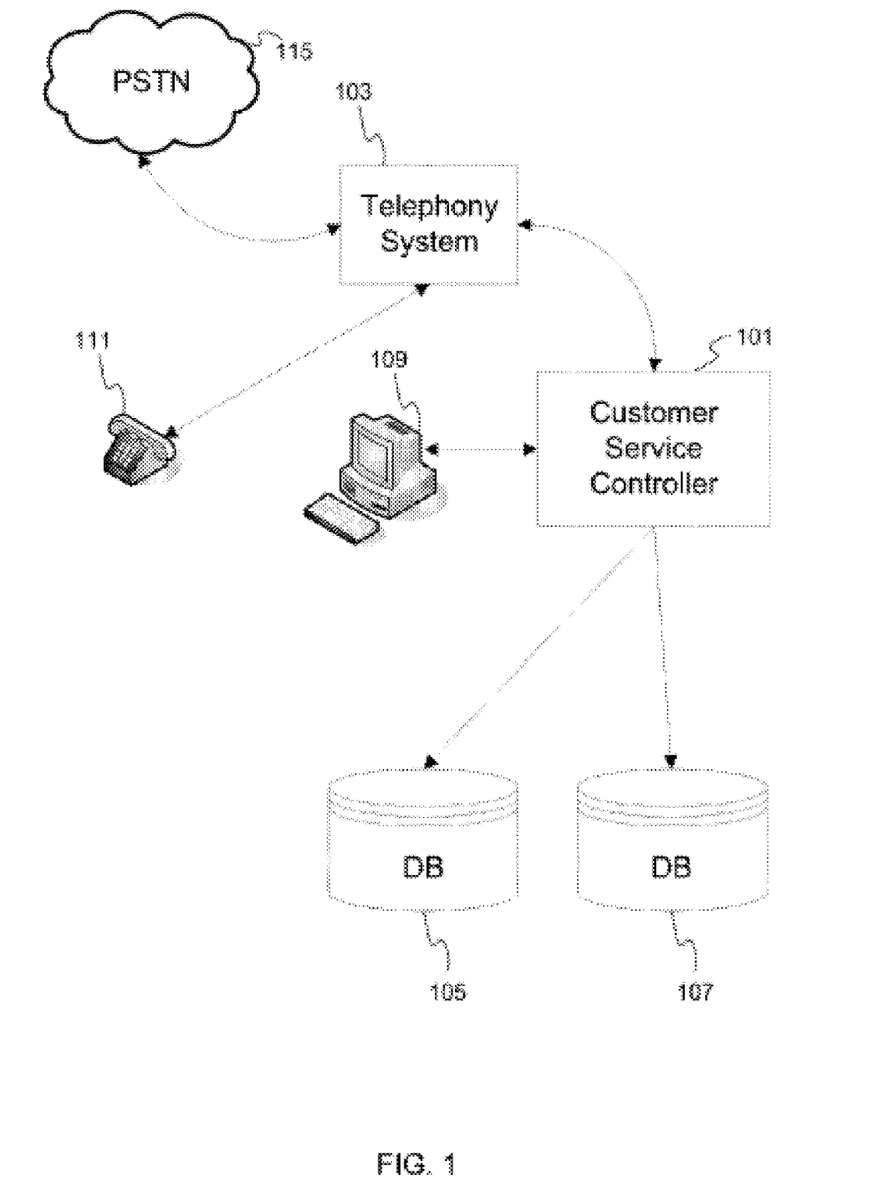
FIG. 1 illustrates an exemplary call center implementation using a customer service controller.

FIG. 1 illustrates an embodiment of a call center implementation using customer service controller 101. FIG. 1 also illustrates a public switched telephone network (PSTN) 115, a telephony system 103, an agent terminal 109, an agent telephone 111, a customer database 105, and an order database 107.

The PSTN 115 is part of the worldwide public switched telephone network. Phone calls travel through the PSTN 115 in a similar fashion to the travel of IP packets travel through the internet. The telephony system 103 receives a phone call from the PSTN 115.

The telephony system 103 uses automatic number identification (ANI) to identify the source of the phone call received from the PSTN 115. The number identifying the source of the phone call provides the identification data needed to identify the caller. The telephony system 103 may also utilize dialed number identification service (DNIS) to identify what phone number was used to dial the call center. Some call centers may use more than one phone number. Often, a call center will handle phone calls consolidated from several business or several products. It is useful in this situation to know which number the caller dialed to reach the call center.

The telephony system 103 sends the identification data to the customer service controller 101. The customer service controller 101 is in communication with the agent terminal 109. The telephony system 103 routes the call to the agent telephone 111. The telephony system 103 may send the identification data to the customer service controller 101 before it routes the call to the agent telephone 111.

As used herein, the phrases "in communication with" and "coupled with" are defined to mean directly connected to or indirectly connected through one or more intermediate components. Such intermediate components may include both hardware and software based components.

Customer service controller 101 may be embodied on a conventional computer, a hybrid personal computer, a personal digital assistant (PDA), a laptop computer, a mobile telephone or any other device that can receive and send information through a communication link. Customer service controller 101 may include a memory, an interface, a processor, and operating firmware/software that performs functions, such as receiving input from a user, generating and transmitting instructions and receiving a response to those instructions. Customer service controller 101 may also include a display device, a keyboard, a mouse, a touch panel, a graphical user interface (GUI), a printer, a scanner, and/or other input/output devices associated with a computer for interacting with a user.

The customer service controller 101 automatically generates a query to customer database 105 using the identification data. The customer database 105 may require authentication from the customer service controller 101. The customer database 105 responds by providing or returning a customer profile that corresponds to the identification data. The customer profile includes information relating to the caller or customer. For example, the customer profile may include the caller's name, address, phone number, number of calls, time and data of most recent call, time and date of first call, or the amount of time the caller waited thus far on the present call.

The customer service controller 101 generates a second query to order database 107. The second query is also based on the identification data. The second query may be generated automatically based on an interactive voice response (IVR). IVR may prompt the user to enter voice commands or touchtone commands that represent the identification data, which may include a registered phone number, account number, trader number, or other information entered by the caller.

The generation of the second query may be initiated based on an input from the agent. The generation of the second query may be initiated based on a combination of an IVR and an input from the agent. The order database 107 responds by sending back order information to the customer service controller 101.

One example of a private group of customers that may have access to a call center utilizing customer service controller 101 are the traders on a commodities or stock exchange. One example of an exchange is the Chicago Mercantile Exchange Inc. (CME), which provides a marketplace where futures and options on futures are traded. The exchange establishes, for each market provided thereby, a specification that defines at least the products traded in that market, minimum quantities that must be traded, and minimum changes in price, which are often referred to as the tick size.

Traders access an electronic trading platform using trading software that displays at least a portion of the order book for a market. The order book contains previously received orders. In this way, incoming orders are matched with previously received orders. Through the trading software, a trader provides parameters for an order for the product traded in the market. Order database 107 includes at least a portion of an order book.

The exchange may utilize a customer service call center to handle customer service issues relating to technical support of the electronic trading platform as well as problems relating to orders and transactions made by way of the exchange. For example, the customer service call center may handle inquiries, issues, and support requests from registered customer contracts for all components of the exchange platform, including electronic trading, order routing and market data interfaces, and network connectivity. The customer service center may be located locally at the exchange or may be located remotely, at any location worldwide.

In the case of a customer service call center utilized by an exchange, order information may include one or more of the following: quantity of the trade, price, date and time that the order was placed, change in price in the time elapsed from the time that the order was placed, the name of the firm that placed the order, account number used to place the order, the ticket order number (TON), and a trader identification number.

In the case of a customer service call center utilized by an exchange, the customer profile may include one or more of the following: name, address, phone number, number of calls, time and data of most recent call, time and date of first call, the amount of time the caller waited thus far on the present call, and information provided on an authorized contacts request form listing the number identified by the ANI.

The authorized contacts request form may include clearing firm information, the name of the registered user authorized as the contact for the clearing firm, and additional trader IDs (user IDs) and account number granted access by the clearing firm. The authorized contract request form may also identify a level of access for each user. Possible levels of access include technical, market, primary firm administrator, and secondary firm administrator. Technical access gives the user or call access only to technical support issues and not to trade or transaction information. Market users are callers permitted to verify order status, cancel orders, invoke cancellation rules, verify market data, and terminate a session due to technical user access.

Primary firm administrator access may be limited to one person per firm, and is the sole recipient of secure data. It is also the referral contact for any customer calling for assistance. The primary firm administrator may have access to create credit controls, manage trader profile table set, modify a user access level, password, and/or supervise users in addition to market permissions. The secondary firm administrator is a backup to the primary first administrator. A clearing firm may have more than one secondary firm administrator.

After the customer service controller 101 presents the customer information and the order information, a procedure is followed by the agent to perform the request of the caller. The procedure includes one or more of verifying security information, establishing the purpose(s) of the call, prioritizing the purposes of the call (if necessary), confirming any cancellation orders, and verifying the state of any remaining orders.

In order to verify security information, the agent must confirm the caller's user ID or trader ID. The user ID or trader ID is included in the customer profile received from the customer database 105, which indexes customer IDs based on the identification data that may have been received through ANI. This ensures that only calls from authorized users are fielded by the agent. The caller may also be required to answer one or more security questions. Security questions may be set by the authorized contacts request form.

Next, the agent establishes the purpose of the call. Primarily, the purpose of the call may be technical support of the electronic trading platform or problems relating to orders and transactions. Technical support questions may require less security information verification than question relating to orders and transactions. Technical support questions include connectivity and access problems with the electronic systems at the exchange.

Requests relating to orders and transactions may include one or more of cancelling all orders by the firm, canceling all orders by the trader, cancelling specific orders by the trader for more than one product, cancelling orders by more than one trader for a specific product, cancelling individual orders, changing the quantity of an individual order, and changing the quantity of a set of orders for a trader or a firm.

If necessary, the customer service controller 101 then prioritizes the requests of the caller based on a predetermined priority algorithm. The priority algorithm may be based, for example, on market risk or execution risk.

The customer service controller 101 will then step the agent through a confirmation procedure to confirm the orders to be cancelled, and upon confirmation the customer service controller 101 may search again for all orders to confirm that all cancelled orders have, in fact, been cancelled. In order to search for all orders, the customer service controller 101 may query the order database 107 a second time. Finally, the customer service controller 101 may prompt the agent to verify the state of any remaining orders.

Figure 2:
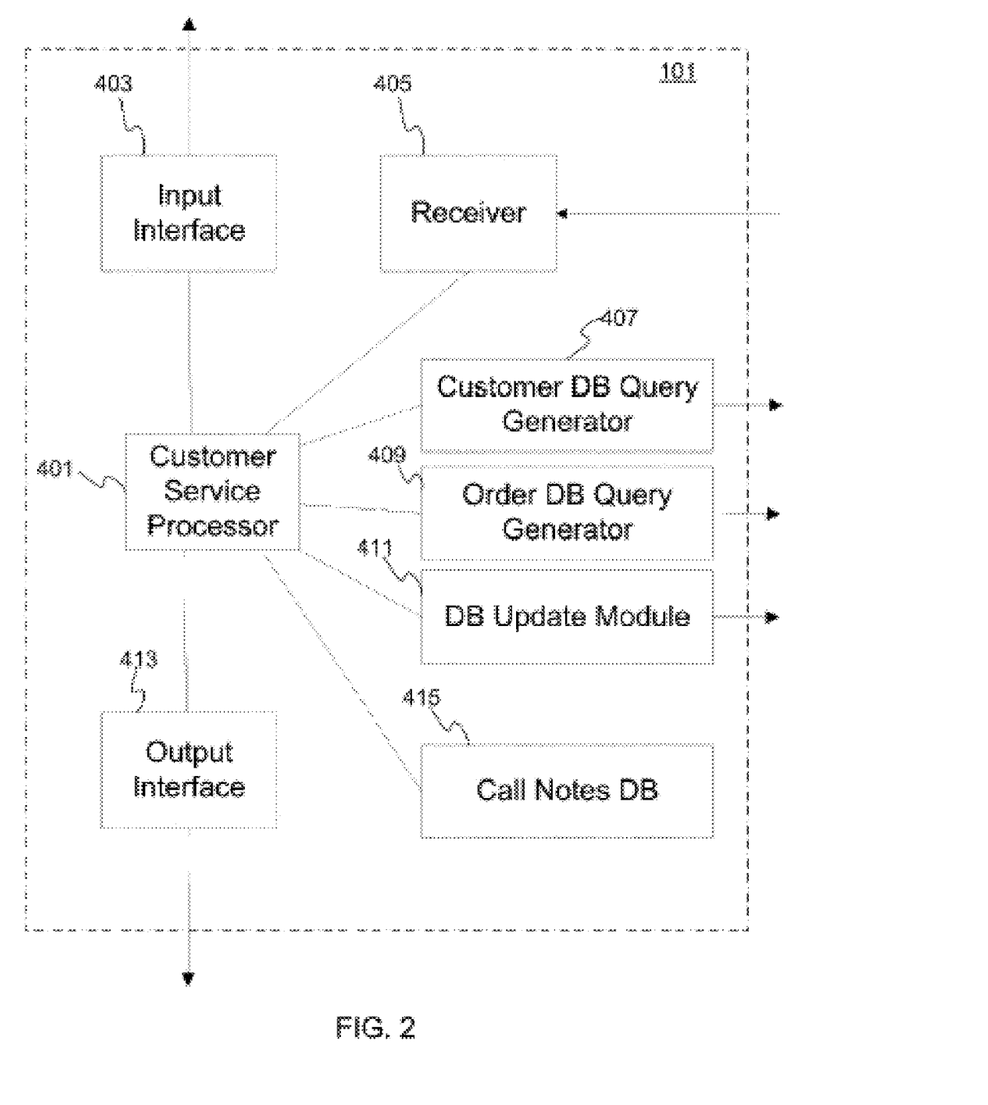
FIG. 2 is a detailed view of an example of the customer service controller.

In some cases the agent may not be authorized or qualified to perform the request of the caller. In this situation the agent may wish to transfer the call to a second agent who has the proper authorization or qualifications. The customer service controller 101 displays a list of agents via output interface 413. The list may include the status of the agents as busy, idle, or available and a timer associated with the status. The customer service controller 101 is configured to send a request back to telephony system 103. The telephony system 103 includes a lookup table that matches agents with their availability, qualifications, and authorizations. The telephony system utilizes the lookup table to select a second agent and sends identification information to the second agent, which now includes the identity of the original agent. The identity of the original agent may be the name of the original agent, the agent's ID number, or the agent's telephone extension.

FIG. 2 is a detailed view of the customer service controller 101. Customer service controller 101 includes a customer service processor 401, an input interface 403, a receiver module 405, a customer database query generator 407, an order database query generator 409, a database update module 411, and an output interface 413. The customer service controller 101 may optionally include a call notes database 415.

The receiver module 405 receives identification data from telephony system 103. The identification data identifies the caller by telephone number. The receiver module 405 may receive the identification data before the telephony system 103 routes the call to telephone 111. This saves time for the customer and allows the handling and cancellation of order more quickly in time critical situations.

The customer database query generator 407 automatically queries customer database 105, provides authentication to the customer database 105, and receives a first response from the customer database 105. The first response may include a customer profile. The customer service database query generator 407 is configured to authenticate to the customer database 105.

The order database query generator 409 queries order database 107, provides authentication to the order database 107, and receives a second response from the order database 107. The second response may include order or transaction information. The order database query generator 409 is also configured to authenticate to the order database 107.

The customer service processor 401 then aggregates the first response and the second response and presents the aggregated first and second responses to the agent by way of output interface 413. The output interface 413 of the customer service controller 101 is in communication with agent terminal 109.

After following all or part of the procedures discussed above, the agent uses the terminal 109 to enter instructions to modify the information contained in one or both of the first response and second response. Terminal 109 is in communication with input interface 403. Through input interface 403 the customer service processor 401 receives the instructions from the agent to modify one or both of the first response and second response. The customer service processor 401 is in communication with the database update module 411. Through instructions from the customer service processor 401, the database update module 411 sends an update to the corresponding one of the customer database 105 and order database 107 based on the instructions received from the agent.

Optional call notes database 415 is in communication with customer service processor 401. Call notes database 415 stores notes entered by one or more agents using one or more input interface(s) 403. The notes may include past requests made by the caller or problems that the agent had with the caller. For example, an agent may wish to record that a particular customer has repeatedly had the same technical support issues, has habitually cancelled orders, or has not cooperated or followed instructions of the agent. Further, the agent may wish to record in the notes database 415 that the agent suspects there are security concerns with the particular caller accessing order information. The customer service processor 401 is configured to retrieve the notes automatically upon receipt of identification information of the caller during subsequent calls and present the retrieved notes to the agent.

In addition to the customer database 105, order database 107, and note database 415, databases may be separately included for each of configurations, customer profiles, order status and net positions, reporting, and call disposition.

The customer service processor 401 may be implemented as hardware, software, or software integrated with hardware. The hardware may include microprocessors, micro-controllers, or digital signal processors, having an electronic erasable program read only memory (EEPROM) or flash memory, static random access memory (RAM), a clocking/timing circuit, or any typical processor utilized in an electrical device. In another embodiment, the customer service processor 401 may be implemented as a combination software algorithm and hardware device.

Further, the customer service controller 101 including one or more of the customer service processor 401, the input interface 403, the receiver module 405, the customer database query generator 407, the order database query generator 409, the database update module 411, the output interface 413, and the call notes database 415 may be embodied using hardware, software, or hardware integrating with software on a conventional computer, a hybrid personal computer, a personal digital assistant (PDA), a laptop computer, a mobile telephone or any other device that can receive and send information through a communication link.

Figure 3:
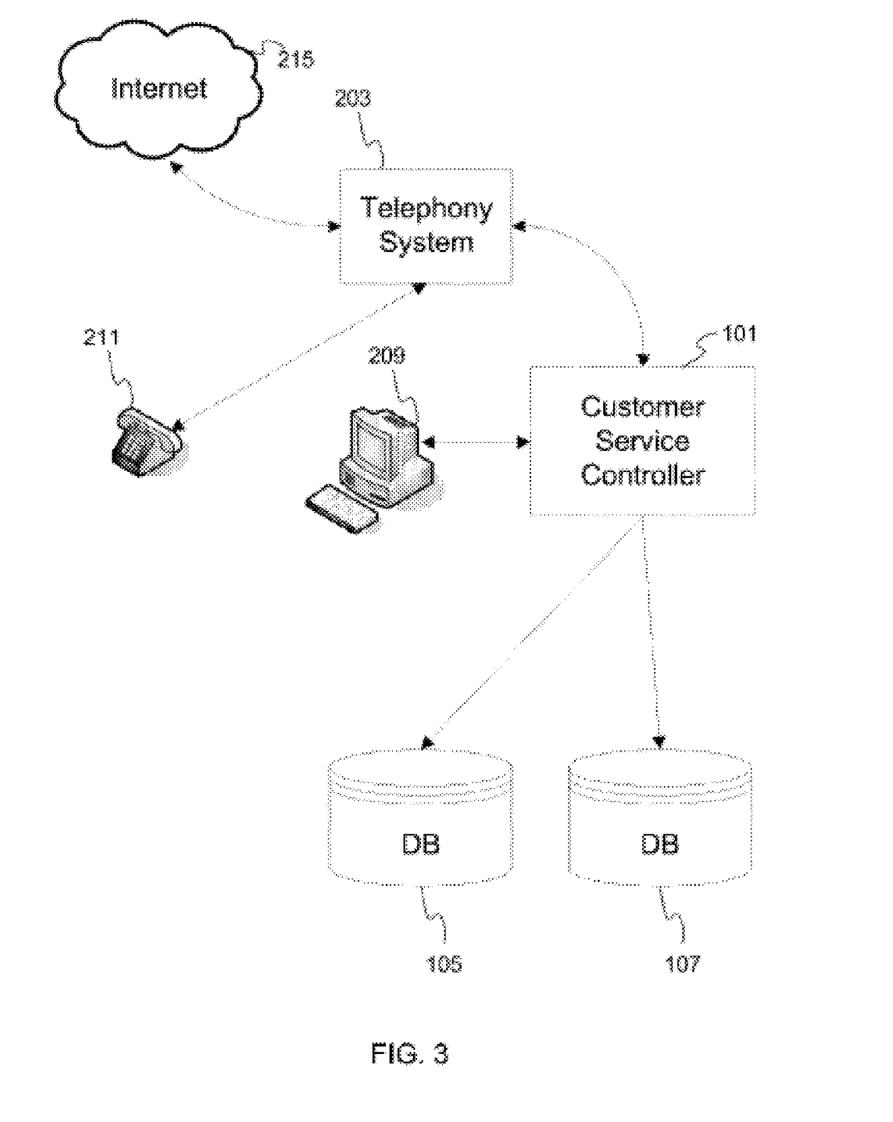
FIG. 3 illustrates an exemplary call center implementation using a customer service controller.

FIG. 3 illustrates an exemplary call center implementation using a customer service controller. Since the component parts which are identical or correspond to those discussed with reference to FIG. 1 are denoted by the same reference numerals, a description will be given of only the point which differs from the first embodiment.

In the call center of FIG. 3, voice over internet protocol (VoIP). VoIP is a system of delivering voice communication using IP packets. The internet 215 provides a vehicle for the voice call rather than utilizing a traditional public switched telephone network. In this case, the telephony system 203 utilizes VoIP to route calls to telephone 211. This would also allow the agent telephone 211 and terminal 209 to become integrated. The agent telephone 211 may be an IP phone running on terminal 209. Terminal 209 may be a conventional computer, a hybrid personal computer, a personal digital assistant (PDA), a laptop computer, a mobile telephone or any other device that can receive and send information through a communication link. Further, the telephone 211, terminal 209, and customer service controller 101 could all be embodied on a single device or integrated as software running on a single device.

Figure 4:
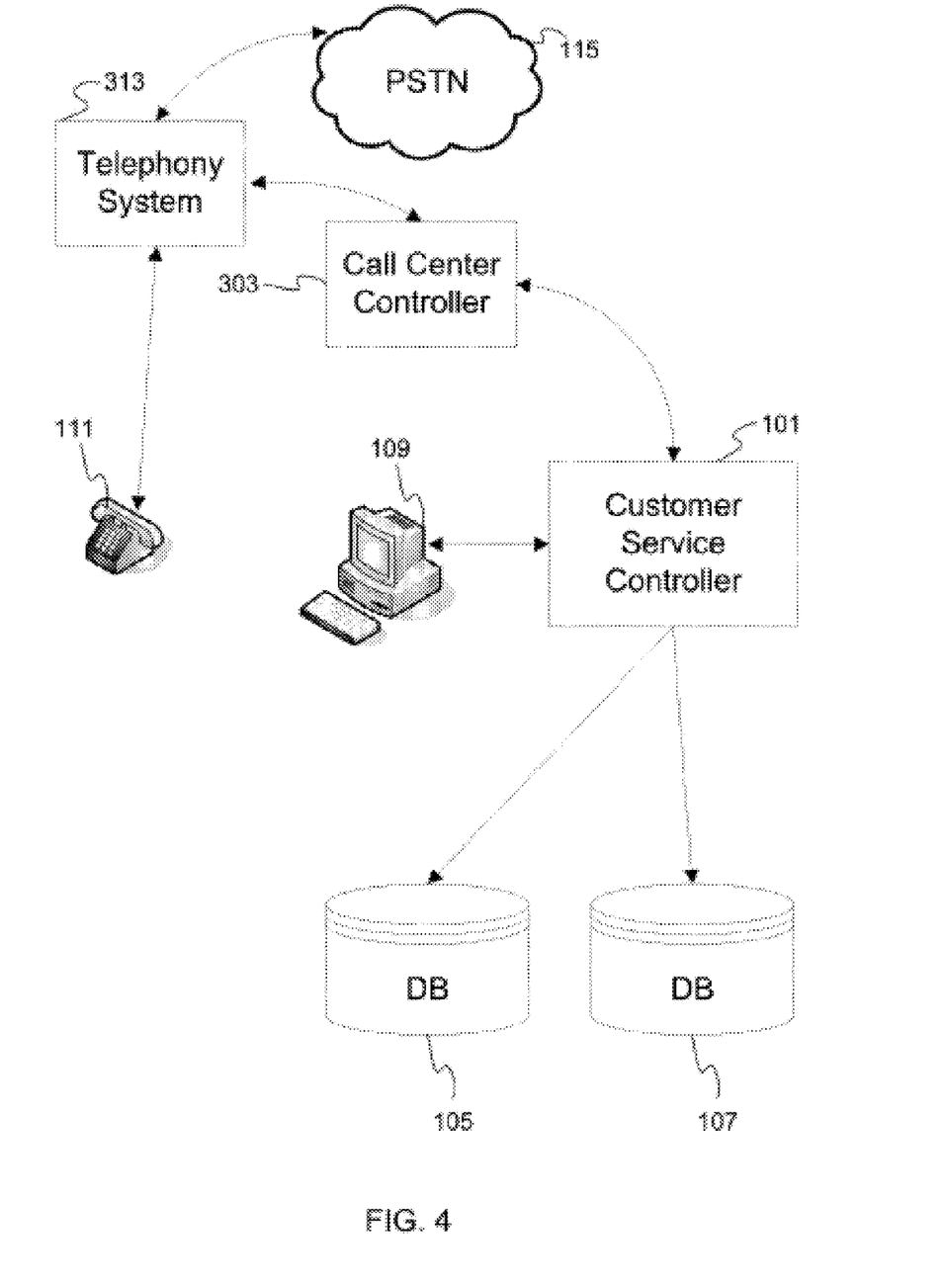
FIG. 4 illustrates an exemplary call center implementation using a customer service controller.

FIG. 4 illustrates an exemplary call center implementation using a customer service controller. Since the component parts which are identical or correspond to those discussed with reference to FIG. 1 are denoted by the same reference numerals, a description will be given of only the point which differs from the first embodiment.

FIG. 4 includes a call center controller 303 and a telephony system 313. In the example shown in FIG. 4, the telephony system 313 may be implemented as a private branch exchange connected to PSTN. The telephony system 313 is configured to route calls upon instruction from the call center controller 303. Call center controller 303 may be embodied on a conventional computer, a hybrid personal computer, a personal digital assistant (PDA), a laptop computer, a mobile telephone or any other device that can receive and send information through a communication link.

Figure 5:
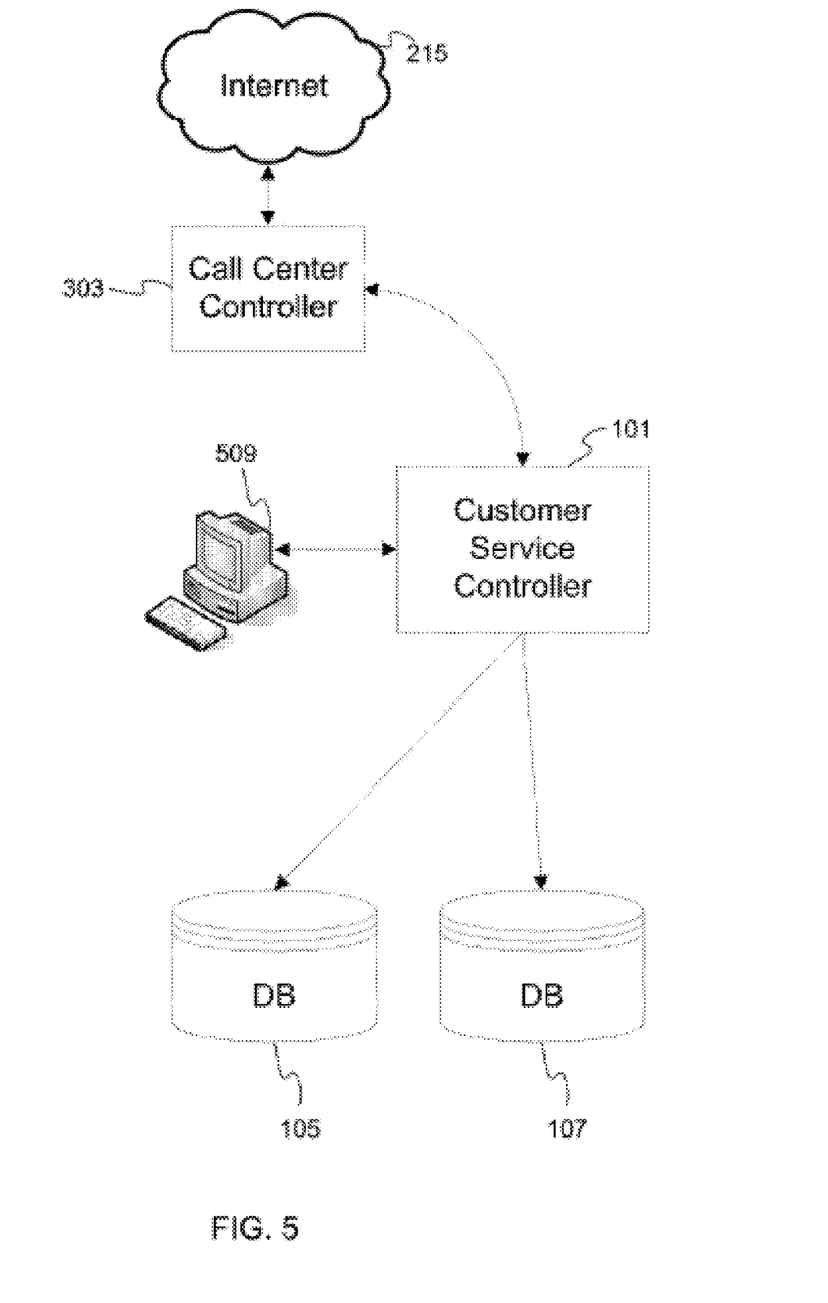
FIG. 5 illustrates an exemplary call center implementation using a customer service controller.

FIG. 5 includes a call center controller 303 directly connected to the Internet 215. The call center controller 303 utilizes VoIP, as discussed above, and routes interactions to customer service controller 101. Interactions may be VoIP calls but may also include email, chat, fax, co-browse or any other type of two way communication that can be accomplished used Internet Protocol. Internet Protocol communication may be identified by email address or IP address. The absence of a physical telephone in FIG. 5 illustrates that terminal 509 is configured to receive and transmit voice using a speaker and microphone, headset, or Bluetooth transceiver.

Customer service controller 101 may also include a supervisory mode. In the supervisory mode a user could initiate an alert indication that would be disseminated to all of the agents by way of call center controller 303. An alert indication may be used to indicate an emergency situations and market events. An emergency situation may be weather or terrorism related. A market event is an abrupt change in one or more markets, which could be due to economic news that drastically effects trading activity. In some situations, a system malfunction in the electronic trading platform may halt the trading market.

Customer service processor 401 may also be configured to receive follow up reminders by way of the input interface 403. An agent may wish to follow up with a caller to make sure a technical support issue was resolved on an order was corrected properly. The customer service processor 401 may be configured to store reminders in a reminder database and present the reminders to the agent by calendar day and/or time of day by way of the output interface 413.

In addition to receiving calls, the customer service controller 101 may also be configured to place calls within the call center. Customer service controller 101 is configured to place a call with telephony system 103. The telephony system 103 then routes the call to the appropriate other customer service controller. The calls may be made by extension or by name.

When calls are made by name, the customer service controller 101 sends a request to the call center controller 303 to place or transfer a call to a name, NAME1. Call center controller 303 includes a lookup table that lists all available names indexed against their extensions. Call center controller 303 retrieves the appropriate extension for NAME1 and sends a request to telephony system 313 to place or transfer a call to the appropriate extension.

The lookup table that indexes names and extensions may also be dynamic so that agents may utilize different workstations having different extensions without causing disruption to the call center. The customer service controller 101 is configured to associate the agent with the extension for telephone 111 when the agent logs into terminal 109.

For example, when an agent, listed as NAME1, logs into terminal 109, the customer service controller 101 receives the login. The agent's login is associated with NAME1. Terminal 109 is associated with the extension for telephone 111. The customer service controller 101 associates NAME1 with the extension for telephone 111 and sends a command to call center controller 303 to replace the listing for NAME1 to include a new listing having the extension for telephone 111. Now future incoming calls or transferred calls will be routed to the agent and telephone 111 even if this is not the agent's usual workstation. In this free seating system, the workstations are interchangeable and no support or maintenance is needed to move agents within the call center. In addition, agents may switch between workstations in different geographical locations. In the free seating system the call center may be relocated with very little deployment time. This is particularly valuable in the case of emergency near the site of the call center.

Telephony system 203 or call center controller 303 may be configured to use skill based routing. Skill based routing involves routing a call to a specific agent based on the skills of the agent. The IVR system may identify the type of request that the caller is making. For example, in the case of the call center supporting a commodities exchange, as discussed above, requests may include technical support, order cancellation, and order modification.

Some agents may be more qualified for one type of request. Some agents may not have authorization to complete some requests. Call center controller 303 may include a look up table in a skill database that lists a rating for each agent regarding each available request. The rating may be on a scale from 0 to 10, with a rating of 0 indicating that the agent is not authorized to field that type of request.

For example, the agent listed as NAME1 may be listed in the skill database with an 8 rating for technical support, a 0 rating for order cancellation because NAME1 is not authorized to cancel orders, and a 3 rating for order modification. This agent is primarily a technical support agent. Another agent, listed as NAME2 may be listed in the skill database with a 1 rating for technical support, a 9 rating for cancellation, and 9 for modification.

When a call comes into call center controller 303, the IVR will retrieve from the call what type of request the caller is making. The call center controller 303 will choose an agent using the skill database. The call center controller 303 may route the call to the most qualified agent.

In another example, the call center controller 303 may route the call to an agent who does not have unique skills. For example, a technical support call may be routed to an agent with a technical support rating of 5 when a second agent has a technical support rating of 7, if the second agent is also the only available agent that has authorization to cancel orders. In this way, a subsequent caller who has needs assistance with cancelling an order may be assisted by the second agent.

The call center controller 303 is also configured to acquire call statistics. The call statistics are stored in a statistics database. Call statistics may include call length, call transfer frequencies, or quantity of calls. The call statistics may be acquired and stored individually for each agent. The call statistics may be acquired and stored individually for each type of request. In this way, call center controller 303 can identify which agents are most efficient and effective for each type of call. Call center controller 303 can then route new calls based on these statistics.

Call center controller 303 may be embodied on a conventional computer, a hybrid personal computer, a personal digital assistant (PDA), a laptop computer, a mobile telephone or any other device that can receive and send information through a communication link. Call center controller 303 may include a memory, an interface, a processor, and operating firmware/software that perform functions, such as receiving input from a user, generating and transmitting instructions, and receiving a response to those instructions. Call center controller 303 may also include a display device, a keyboard, a mouse, a touch panel, a graphical user interface (GUI), a printer, a scanner, and/or other input/output devices associated with a computer for interacting with a user. Call center controller 303 may also be implemented in combination with customer service controller 101 in any of the above embodiments. In some embodiments, call center controller 303 may be coupled to and in communication with one or more of the customer database 105, order database 107, and note database 415.

It should be understood that various changes and modifications to the presently preferred embodiments described herein will be apparent to those skilled in the art. Such changes and modifications can be made without departing from the teachings of the present invention and without diminishing its intended advantages. It is therefore intended that such changes and modifications be covered by the appended claims.

We claim:

1. A method comprising:
   identifying, by a call center processor based on a call received from a caller, at least one type of request associated with the call, the type of request being one of a plurality of request types;
   selecting, by the call center processor automatically from a database coupled therewith, an agent, from among a plurality of agents, to which the call will be routed;
   routing the call, by the call center processor, to an agent terminal associated with the selected agent;
   receiving, by the call center processor via an input interface of the agent terminal, instructions from the selected agent representing a plurality of requests communicated by the caller to the selected agent, each of the plurality of requests relating to one or more of connecting to an electronic trading platform, accessing the electronic trading platform, cancelling all orders by a firm, canceling all orders by a trader, cancelling specific orders by a trader for more than one product, cancelling orders by more than one trader for a specific product, cancelling individual orders, changing the quantity of an individual order, and changing the quantity of a set of orders for a trader or a firm; and
   prioritizing, automatically by the call center processor, the instructions corresponding to each of the plurality of requests based on a predetermined priority algorithm which is based on market risk and/or execution risk.

2. The method of claim 1, wherein the at least one type of request is identified using an interactive voice response system.

3. The method of claim 1, wherein selecting an agent further comprises:
   generating, by the call center processor, a query to the database coupled therewith based on the identified at least one type of request associated with the call, wherein the database includes data indicative of each of the plurality of agents, each agent being associated with data indicative of a rating characterizing a skill of the associated agent for at least one of the plurality of request types; and
   receiving, by the call center processor from the database, a response identifying an agent, the response being based on the associated rating.

4. The method of claim 3, wherein the rating associated with an agent in the database indicates that associated agent is not authorized to field a particular type of request.

5. The method of claim 1, wherein the database includes data indicative of each of the plurality of agents, each agent being associated with data indicative of a subset of a set of skills, wherein each skill of the set corresponds to one of the plurality of request types, the selecting further comprising selecting an agent whose associated subset of skills includes a skill which corresponds to the identified at least one request type.

6. The method of claim 5, wherein two or more agents are associated with a subset of skills which includes the skill which corresponds to the identified at least one request type, the selecting further comprising:
   selecting an agent from the two or more agents associated with a subset of skills including the least number of additional skills.

7. The method of claim 6, wherein two or more agents are associated with a subset of skills which includes the skill which corresponds to the identified at least one request type and which includes the same number of additional skills, the selecting further comprising:
   selecting an agent from among the two or more agents based on a rating associated with each skill of the subset associated with the agent, the rating being an indication of the level of skill of the agent, wherein the agent associated with the highest rating for the skill which corresponds to the identified at least one request type is selected.

8. The method of claim 5, wherein the set of skills comprises a technical support skill, an order cancellation skill, and an order modification skill.

9. The method of claim 1, wherein the call center processor allows a user to initiate, via the input interface, an alert indication to be disseminated to all agents, wherein the alert indication may be used to indicate one or more of an emergency situation and a market event.

10. The method of claim 9, wherein the emergency situation comprises weather or terrorism related events.

11. The method of claim 9, wherein the market event comprises an abrupt change in one or more markets or economic news that drastically effects trading activity.

12. The method of claim 1, wherein the routing further comprises:
    retrieving, by the call center processor from a lookup table coupled therewith that lists all agent names indexed against their currently associated agent terminal, the currently associated terminal for the selected agent and routing the call thereto.

13. The method of claim 12, wherein an agent's name is associated with their login to an agent terminal, wherein a processor associates the agent's name with the agent terminal when the agent logs into the agent terminal, and wherein the processor sends a command to the lookup table to replace the listing for the agent's name to include a new listing for the agent's associated agent terminal each time the agent logs into an agent terminal.

14. The method of claim 1, further comprising:
    receiving, by the call center processor, notes from the selected agent regarding one or more of the caller and the order information; and
    storing, by the call center processor, the notes in a customer database associated with the caller.

15. The method of claim 1, further comprising:
    receiving, by the call center processor via the input interface of the agent terminal, instructions from the selected agent to fulfill the plurality of requests of the caller.

16. The method of claim 1, further comprising:
    collecting, by the call center processor, call statistics for the selected agent.

17. The method of claim 16, further comprising:
ranking, by the call center processor, the selected agent based on the call statistics.

18. The method of claim 17, wherein selecting further comprises selecting an agent based on the ranking.

19. A system comprising:
an interactive voice response module coupled with a call center processor and operable to identify, based on a call received from a caller, at least one type of request associated with the call, the type of request being one of a plurality of request types;
a query generator coupled with the call center processor and operable to select from a database coupled therewith, an agent, from among a plurality of agents, to which the call will be routed;
an output interface coupled with the call center processor and operable to route the call to the selected agent;
an input interface coupled with the call center processor and operable to receive instructions from the selected agent representing a plurality of requests communicated by the caller to the selected agent, each of the plurality of requests relating to one or more of connecting to an electronic trading platform, accessing the electronic trading platform, cancelling all orders by the firm, canceling all orders by the trader, cancelling specific orders by the trader for more than one product, cancelling orders by more than one trader for a specific product, cancelling individual orders, changing the quantity of an individual order, and changing the quantity of a set of orders for a trader or a firm; and
the call center processor being operable to automatically prioritize the instructions corresponding to each of the plurality of requests based on a predetermined priority algorithm which is based on market risk and/or execution risk associated with the previously received currently pending orders.

20. The system of claim 19, wherein the database includes data indicative of each of the plurality of agents, each agent being associated with data indicative of a rating characterizing a skill of the associated agent for at least one of the plurality of request types, and wherein the selection of an agent is based on the rating associated therewith.

21. The system of claim 20, wherein the plurality of agents includes a first agent and a second agent, wherein the second agent has higher ratings for each of the same type of requests as the first agent, including an additional rating for at least one additional request, and wherein the first agent is selected for any type of request that the first agent has in common with the second agent, if the second agent is also the only available agent for the at least one additional request.

22. The system of claim 19, wherein the call center processor collects call statistics for the selected agent, ranks the selected agent based on the call statistics, and selects the selected agent based on the ranking.

23. The system of claim 22, wherein the call statistics include at least one or more of a call length, a call transfer frequency, and a quantity of calls.

24. The system of claim 19, wherein the call center processor allows a user to initiate, via the input interface, an alert indication that is disseminated to all agents, wherein the alert indication may be used to indicate one or more of an emergency situation and a market event.

25. The system of claim 19, wherein the input interface is operable to receive instructions from the selected agent to fulfill the plurality of requests of the caller.

26. A method of routing communications comprising:
identifying at least one type of request from a customer, the type of request being one of a plurality of request types;
selecting an agent from among a plurality of agents, from a database, based on a skill rating that each of the plurality of agents has for each type of request;
routing a communication to the selected agent;
receiving instructions from the selected agent, via an agent terminal associated with the selected agent, representing a plurality of requests of the customer, each of the plurality of requests comprising one or more of a technical support request, an order cancellation request, and an order modification request;
prioritizing the plurality of requests based on a predetermined priority algorithm which is based on market risk and/or execution risk;
receiving instructions from the selected agent to fulfill the plurality of requests of the customer;
collecting communication statistics for the selected agent; and
ranking the selected agent based on the communication statistics.

27. The method of claim 26, wherein the one or more technical support requests, order cancellation requests, and order modification requests comprises one or more of connecting to an electronic trading platform, accessing the electronic trading platform, cancelling all orders by a firm, canceling all orders by a trader, cancelling specific orders by a trader for more than one product, cancelling orders by more than one trader for a specific product, cancelling individual orders, changing the quantity of an individual order, and changing the quantity of a set of orders for a trader or a firm.

28. The method of claim 26, wherein the customer is a caller and the communication is a telephone call within a telephony system.

29. The method of claim 26, wherein the routing further comprises receiving a request to route a communication based on an agent name, retrieving, from a lookup table that lists all agent names indexed against their associated agent terminal, the associated agent terminal for the agent name and routing the communication thereto.

30. The method of claim 29, wherein an agent's name is associated with their login to an agent terminal, wherein a processor associates the agent's name with the agent terminal when the agent logs into the agent terminal, and wherein the processor sends a command to replace the listing for the agent's name in the lookup table to include a new listing for the agent's associated agent terminal each time the agent logs into an agent terminal.

* * * * *